(12) United States Patent
Keller et al.

(10) Patent No.: US 10,458,864 B1
(45) Date of Patent: Oct. 29, 2019

(54) INDEXABLE STRAIN SENSOR

(71) Applicant: Facebook Technologies, LLC, Menlo Park, CA (US)

(72) Inventors: Sean Jason Keller, Kirkland, WA (US); Tristan Thomas Trutna, Seattle, WA (US); David R. Perek, Bellevue, WA (US); Bruce A. Cleary, III, Seattle, WA (US); Brian Michael Scally, Seattle, WA (US)

(73) Assignee: Facebook Technologies, LLC, Menlo Park, CA (US)

(*) Notice: Subject to any disclaimer, the term of this patent is extended or adjusted under 35 U.S.C. 154(b) by 0 days.

(21) Appl. No.: 16/231,119

(22) Filed: Dec. 21, 2018

Related U.S. Application Data

(63) Continuation of application No. 15/382,496, filed on Dec. 16, 2016, now Pat. No. 10,197,459.

(60) Provisional application No. 62/269,047, filed on Dec. 17, 2015.

(51) Int. Cl.
*G01L 1/14* (2006.01)
*G06F 3/01* (2006.01)
*G01B 7/16* (2006.01)

(52) U.S. Cl.
CPC ............ *G01L 1/144* (2013.01); *G01B 7/22* (2013.01); *G01L 1/146* (2013.01); *G06F 3/014* (2013.01)

(58) Field of Classification Search
CPC ........... G01L 1/144; G01L 1/146; G01B 7/22; G06F 3/014

USPC ....... 73/780, 862.26, 862.046, 862.043, 718, 73/724, 865.4; 345/169, 184
See application file for complete search history.

(56) References Cited

U.S. PATENT DOCUMENTS

| | | | |
|---|---|---|---|
| 6,304,840 B1 | 10/2001 | Vance et al. | |
| 6,701,296 B1 | 3/2004 | Kramer et al. | |
| 7,070,571 B2 | 7/2006 | Kramer et al. | |
| 7,472,047 B2 | 12/2008 | Kramer et al. | |
| 9,476,692 B2 | 10/2016 | Reese | |
| 9,529,433 B2 | 12/2016 | Shankar et al. | |
| 9,612,102 B2 | 4/2017 | Reese et al. | |
| 9,905,207 B2 | 2/2018 | Louhivuori et al. | |
| 10,055,018 B2 | 8/2018 | Tokubo et al. | |
| 2007/0248799 A1* | 10/2007 | DeAngelis | G01L 1/146 428/209 |
| 2008/0127739 A1* | 6/2008 | DeAngelis | G01L 1/146 73/718 |
| 2010/0036287 A1 | 2/2010 | Weber | |
| 2011/0282164 A1 | 11/2011 | Yang et al. | |
| 2016/0033255 A1 | 2/2016 | Reese | |
| 2016/0187973 A1 | 6/2016 | Shankar et al. | |

(Continued)

*Primary Examiner* — Jonathan M Dunlap
(74) *Attorney, Agent, or Firm* — Fenwick & West LLP

(57) ABSTRACT

A deformation sensing apparatus comprises an elastic substrate, a conductive element, and an additional conductive element. The conductive element includes conductive joints that are separated from each other by resolving elements along a length of the conductive element. Different combinations of conductive joints and resolving elements correspond to different segments of the deformation sensing apparatus. Based on a change in capacitance between a conductive joint and the additional conductive element when a strain is applied to the deformation sensing apparatus, the deformation sensing apparatus generates a signal that allows determination of how the strain deforms the deformation sensing apparatus.

20 Claims, 11 Drawing Sheets

(56) References Cited

U.S. PATENT DOCUMENTS

2016/0305759 A1 10/2016 Reese et al.
2017/0168567 A1 6/2017 Reese et al.

* cited by examiner

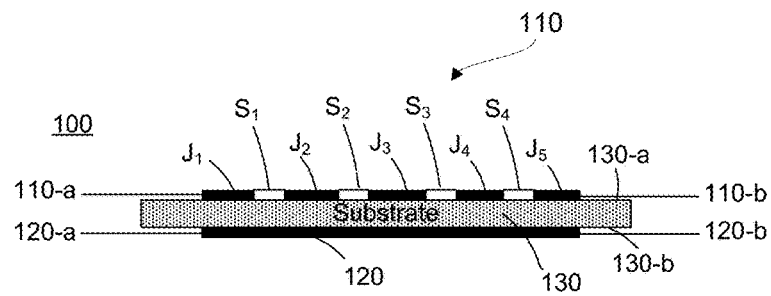
FIG. 1A
FIG. 1B
FIG. 1C
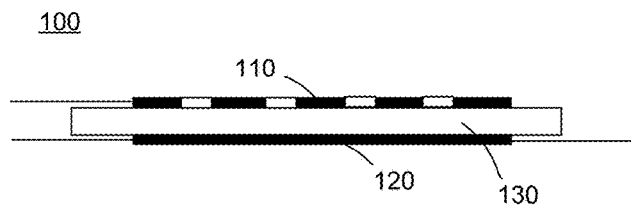
FIG. 2A
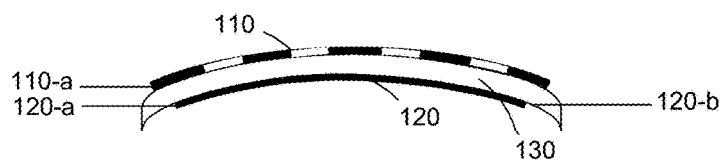
FIG. 2B
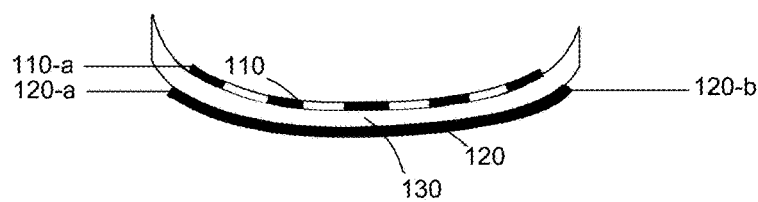
FIG. 2C

INDEXABLE STRAIN SENSOR

CROSS REFERENCE TO RELATED APPLICATIONS

This application is a continuation of co-pending U.S. application Ser. No. 15/382,496, filed Dec. 16, 2016, which claims the benefit of U.S. Provisional Application No. 62/269,047, filed Dec. 17, 2015, which is incorporated by reference in its entirety.

BACKGROUND

Virtual reality (VR) systems typically provide multiple forms of sensory output, such as a VR headset and headphones, which operate together to create the illusion that a user is immersed in a virtual world. A VR system can also include an input or wearable device. such as a VR glove. that detects position, acceleration, orientation, and other information associated with the user's hand and provides the information as input. The input can then be used to move a corresponding item in the virtual world (e.g., a hand or other appendage belonging to a character in the virtual world) when the glove detects movement of the user's hand in the real world. A VR glove can also be used to facilitate interactions with other objects in the virtual world. For example, the VR system can allow the user to use the glove to manipulate virtual objects by touching them, picking them up, and moving them.

Strain sensors may be included in an input or a wearable device, such as a VR glove, to facilitate virtual manipulation of virtual objects. Strain sensors measure strain resulting from applied deformations based on a change in an electrical characteristic (e.g., a resistance, an inductance, or a capacitance) of electrical elements (such as resistive strain gauges, capacitive sensors, or inductive sensors) formed therein. However, a conventional strain sensor is unable to resolve multiple measures of deformation (stretch or flex) occurring at different portions (segments) along its length through a common electrical interface (e.g., a single pair of terminals for an array of two terminal devices). Multiple strain sensors, if cascaded along their lengths to resolve measures of deformation along portions of the combined length, use multiple independent conductive wires or terminals to obtain signals from the various different cascaded sensors. This additional wiring can make cascaded sensors unwieldy in some devices.

SUMMARY

A deformation sensing apparatus comprises an elastic substrate, a multi-segment conductive element formed on a surface of the elastic substrate, and an additional conductive element formed on the same or an additional surface of the elastic substrate. In one or more embodiments, the elastic substrate is a dielectric, so a capacitor is formed by an electric field coupling between charges resident on each conductive element on the surface of the elastic substrate and the additional conductive element on the opposing, parallel, surface of the elastic substrate. Accordingly, a plurality of conductive joints are formed along a length of the multi-segment conductive element. In some embodiments, different conductive joints, or "segments," correspond to regions of interest that can be independently interrogated based on properties (e.g., amplitude, frequency) of an interrogating stimulus signal. Different segments may be separated by physical or mechanical resolving elements (e.g., physical switching elements such as electromechanical switches), or may be formed in a physical continuum without being separated by changes in geometry and without physical or mechanical demarcation.

In embodiments where the segments are not separated by physical switching elements but rather form a physically continuous indexable surface, where different segments are identified by an index, the multi-segment conductive element may be a continuous strip where different segments respond to different frequencies. For example, the multi-segment conductive element is sufficiently resistive so capacitive coupling between different segments of the conductive element with respect to the additional conductive element result in different segments along the length of the conductive element having different effective RC time constants. In the case of the physically continuous indexable surface, the resistive elements along the length of the surface correspond to resolving elements separating conductive joints that can be resolved to spatially interrogate segments of the conductive element based on properties of an interrogating stimulus signal applied to the multi-segment conductive element. In some embodiments, a strain on each segment or joint of the multi-segment conductive element is separately obtained by varying the frequency of the stimulus signal applied to the deformation sensing apparatus based on the complex circuit created by the deformation sensing apparatus.

The deformation sensing apparatus may be used in wearable devices such as gloves, headsets, or any other fabric that conforms to a user's body part and can be used to detect and resolve movement of multiple spatial regions or portions of the user's body part. For example, using an indexable sensor within a region of a wearable device that internally undergoes different measures of stretches or bends along different indexed segments of the deformation sensing apparatus is beneficial. As an example, different amounts of stretching occur in different parts of a moving object wearing a wearable device, which can be independently resolved and measured by different segments of the indexable sensor. Similarly, in the case of bending deformations, an object (e.g., a body part) wearing a wearable device including the deformation sensing apparatus may bend at a location of one of the conductive joints of the deformation sensing apparatus, but not at other conductive joints of the deformation sensing apparatus. Hence, a location of the deformation sensing apparatus corresponding to the bend of the object can be more precisely resolved if the different conductive joints of the deformation sensing apparatus are spatially indexable.

According to one or more embodiments, a wearable device comprises one or more indexable deformation sensors, a measurement circuit, and a deformation analyzer. Each indexable deformation sensor includes an elastic substrate comprising a flexible, electrically-insulating dielectric material, a multi-segment conductive element formed on a side of the elastic substrate and comprising a plurality of conductive joints formed along a length of the element. The conductive joints are separated from each other by resolving elements. An additional conductive element is formed on an additional side of the elastic substrate. In some embodiments, an indexable deformation sensor outputs a signal responsive to an applied deformation, the signal obtained between the multi-segment conductive element and the additional conductive element and indicating an electrical capacitance across the elastic substrate. In some embodiments, the additional conductive element formed on the additional surface of the elastic substrate is a strain gauge whose resistance changes based on a strain applied along a length of the strain gauge. The deformation analyzer computes a measure of stretch deformation and a measure of flex deformation at different spatial regions of the indexable deformation sensor based on signals obtained from segments of the elastic substrate corresponding to the different spatial regions.

In some embodiments, the orientations or positions of points on the wearable device (such as a glove) worn around a user's body part (e.g., fingers of a hand) are used to determine a state of the user's body part. For example, the orientations or positions of points on a glove (or other wearable device) are provide information about or to render a state of the hand (or other body part) in a VR (virtual reality) environment. For example, states of a user's hand (e.g., open, closed, pointing, gesturing, etc.) are determined based on the bend angles of the user's fingers or finger tips corresponding to the positions or orientations of points on the glove.

BRIEF DESCRIPTION OF THE DRAWINGS

FIGS. 1A-1C illustrate each a side view of an indexable deformation sensor, with and without applied stretch deformation, in accordance with one or more embodiments.

FIGS. 2A-2C illustrate each a side view, of an indexable deformation sensor with and without applied flex deformation, in accordance with one or more embodiments.

Figure 3A:
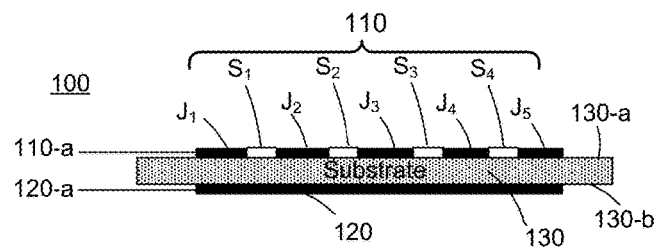
FIG. 3A-3D illustrate each a side view, of an indexable deformation sensor, illustrating activation of different resolving elements and connection of different element joints, in accordance with one or more embodiments.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

FIGS. 1A-1C illustrate each a side view of an indexable deformation sensor at rest, under tension, and under compression, respectively, in accordance with one or more embodiments.

FIG. 1A shows a side view of the indexable deformation sensor 100 without any applied deformation, in accordance with one or more embodiments. As shown in FIG. 1A, deformation sensing apparatus 100 includes a multi-segment conductive element 110, an additional strain-conductive element 120, and an elastic substrate 130. In various embodiments, the elastic substrate 130 comprises a dielectric material. The multi-segment conductive element 110 is formed on a surface 130-a of the elastic substrate 130. The additional conductive element 120 is formed on an additional surface 130-b of the elastic substrate 130, the additional surface 130-b being opposite to the surface 130-a.

The multi-segment conductive element 110 and the additional conductive element 120 output a signal in response to a strain applied in a direction, the signal indicating a capacitance of the elastic substrate 130. In some embodiments, the additional conductive element 120 is a strain gauge configured to output an additional signal in response to a strain applied in the same direction, where the additional signal indicates a change in resistance of the additional conductive element 120. In some embodiments, the multi-segment conductive element 110 and the additional conductive element 120 are symmetrically formed on opposite sides of the elastic substrate 130 to have a same, or a symmetrically corresponding, alignment on the opposite sides of the elastic substrate 130. For example, the multi-segment conductive element 110 and the additional conductive element 120 are parallel (and optionally coincide and are co-planar), so the multi-segment conductive element 110 and the additional conductive element 120 produce like responses to a strain applied in a specific direction. Thus, when a strain is applied along a direction parallel to a length of the multi-segment conductive element 110 and the additional conductive element 120, both the multi-segment conductive element 110 and the additional conductive element 120 undergo like deformation responsive to the strain.

Although the multi-segment conductive element 110 and the additional conductive element 120 are shown on opposite sides of the elastic substrate 130, multi-segment conductive element 110 and the additional conductive element 120 could alternatively be provide on the same surface of elastic substrate 130 or in some other configuration. What is important is that the segments of multi-segment conductive element 110 have a known undeformed geometric relationship to the additional conductive element 120. The undeformed geometric relationship, thus, allows for a mapping of possible deformations to correspond to the observed changes in capacitances that can be used to deduce the likely deformation.

In some embodiments, and as illustrated in FIGS. 1A-1C, the multi-segment conductive element 110 comprises a plurality of conductive joints J1, J2, J3, J4, and J5. Each conductive joint J1, J2, J3, J4, and J5 comprises conductive materials and formed along a length of the multi-segment conductive element 110 and separated. The conductive joints J1, J2, J3, J4, and J5 are separated from each other by resolving elements S1, S2, S3, and S4.

As illustrated in FIG. 1A, and in some embodiments, the multi-segment conductive element 110 has a terminal 110-a, and optionally an additional terminal 110-b. The additional conductive element 120 optionally has two distinct terminals, a third terminal 120-a and a fourth terminal 120-b, as shown in FIG. 1A. The signal indicative of capacitance of the dielectric substrate 130 is measurable across the terminal 110-a of the multi-segment conductive element 110 and the third terminal 120-a of the additional conductive element 120. In some embodiments, the signal is indicative of a capacitance (C) or a capacitance change (ΔC) of the multi-segment conductive element 110 measured in response to an applied deformation. The deformation may occur in response to the applied strain in the direction and other deformations (such as a flexing or bending deformations).

In some embodiments, the additional conductive element 120 is a strain gauge and the additional signal is measurable across the third terminal 120-a and the fourth terminal 120-b of the additional conductive element 120. In some embodiments, the additional signal indicates a resistance (R1) or resistance change (ΔR1) of the additional conductive element 120 measured responsive to the applied deformation.

Illustrative materials for the elastic substrate 130 include Silicone (PDMS), which can be doped with conductive particles (carbon black, carbon nanotubes, silver nanoparticles or nanowires) to create conductive strain sensitive paths (strain-gauge elements). Configurations can range in hardness from less than 10 durometer through 100 durometer, tolerate stretching exceeding 200% and having a maximum bend radius as small as the total thickness of the indexable deformation sensor 100. The dielectric elastic substrate 130 can be a homogeneous elastomer, or can be an elastomer foam (open cell or closed cell) that produces a non-linear gap to dielectric permittivity relationship that may provide improved sensitivity to specific deformation values or ranges.

FIG. 1B illustrates a length-wise stretch of the indexable deformation sensor 100, resulting in an extension of the lengths of the multi-segment conductive element 110 and the additional conductive element 120 and a reduction in width (thickness) of the elastic substrate 130. Because of the change in dimensions of the multi-segment conductive element 110 and the additional conductive element 120 and the change in the thickness of the intervening dielectric substrate 130, capacitance C of the dielectric substrate 130 measured across a portion of the multi-segment conductive element 110 and the additional conductive element 120 changes in a known and deterministic way as a function of changes in geometry; the resistance R1 through the additional conductive element 120 also changes in a known and deterministic way because of the change in dimensions of the multi-segment conductive element 110 and the additional conductive element 120 and the change in the thickness of the intervening dielectric substrate 130. The signal indicates the measured capacitance C, or a change in the capacitance C, while the additional signal indicates the measured resistance R1 or a change in the resistance R1. In some embodiments, and as described further with reference to FIG. 5, a combination of the signal and the additional signal can be used to estimate a magnitude (and optionally direction) of extension of the indexable deformation sensor 100.

Conversely, FIG. 1C illustrates a deformation in response to a compression of the indexable deformation sensor 100. In some implementations, in the absence of deformation (shown in FIG. 1A), the multi-segment conductive element 110 and the additional conductive element 120 are configured to have a preexisting elongation stretch when formed in the substrate. In such implementations, the multi-segment conductive element 110 and the additional conductive element 120 can sense compression resulting in a decrease of their preexisting elongation stretch.

FIGS. 2A-2C illustrate each a side view of a deformation sensing apparatus with and without different applied flex deformations, in accordance with one or more embodiments. FIG. 2A illustrates the indexable deformation sensor 100 in the absence of deformation. FIGS. 2B-2C illustrate a flexion (flex deformation) of the indexable deformation sensor 100 resulting in an arcing or bending of the surfaces of the elastic substrate 130. The bending causes an asymmetric change in dimensions of the multi-segment conductive element 110 and the additional conductive element 120. For example, in FIG. 2B, a length of the multi-segment conductive element 110 increases more than a length of the additional conductive element 120 when the indexable deformation sensor 100 is bent in a direction towards the additional conductive element 120.

In the example of FIG. 2C, the length of the additional conductive element 120 increases more so than the length of the multi-segment conductive element 110 when the indexable deformation sensor 100 is bent in a direction towards the multi-segment conductive element 110. Hence, the resistance R1 of the additional conductive element 120 varies asymmetrically under the applied flex deformations in a deterministic manner. Additionally, a change in the thickness and orientation of the dielectric substrate 130 as a result of the applied flex deformation changes in the capacitance C between the multi-segment conductive element 110 and the additional conductive element 120 in a known and deterministic manner.

As further described above in conjunction with FIGS. 1A-1C, the signal and the additional signal indicate, respectively, the capacitance C (or a change in capacitance) between the multi-segment conductive element 110 and the additional conductive element 120 and the resistance R1 (or a change in resistance) of the additional conductive element 120. As further described below in conjunction with FIG. 2, the signal and the additional signal may be used to estimate a magnitude (and optionally direction) of flex extension of the indexable deformation sensor 100.

FIGS. 3A-3D illustrate each a side view, of an indexable deformation sensor 100, illustrating activation of different resolving elements S1, S2, S3, and S4 and connection of different conductive joints J1, J2, J3, J4, and J5, in accordance with one or more embodiments.

FIG. 3A illustrates the indexable deformation sensor 100 further described above in conjunction with FIGS. 1A-2C. The indexable deformation sensor 100 includes a multi-segment conductive element 110 formed on a first surface 130-a of an elastic substrate 130. The multi-segment conductive element 110 comprises a plurality of conductive joints J1, J2, J3, J4, and J5 each made of conductive materials and formed along a length of the multi-segment conductive element 110. Each conductive joint J1, J2, J3, J4, and J5 is separated from another conductive joint, J1, J2, J3, J4, and J5 by a resolving element, S1, S2, S3, and S4. For example, each resolving element S1, S2, S3, and S4 is a switch. Additionally, the indexable deformation sensor 100 includes an additional conductive element 120 formed on a second surface 130-b of the elastic substrate 130, the second surface 130-b being opposite to the first surface 130-a.

Figure 3B:
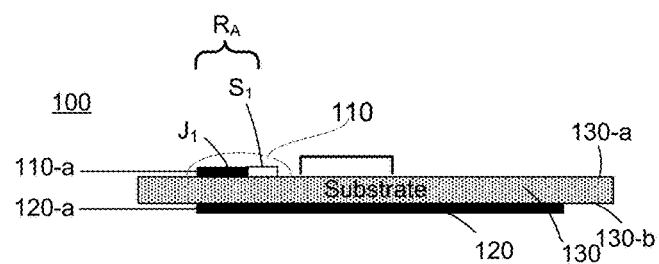

As illustrated in FIG. 3B, turning off resolving element S1, connects conductive joint J1 to a terminal 110-a, while disconnecting the remaining conductive joints J2, J3, J4, and J5 from the terminal 110-a. Hence, the signal measured via the terminal 110-a indicates a capacitance measured between conductive switch J1 and the additional conductive element 120, which represents a deformation of a region RA of the indexable deformation sensor 110 including conductive joint J1 and resolving element S1.

Figure 3C:
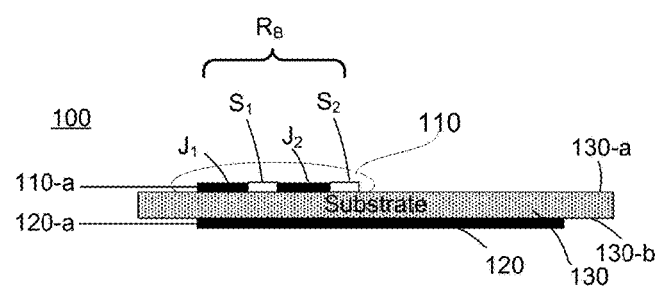

In FIG. 3C by turning off resolving element S2 and turning on resolving element S1 couples conductive joint J1 and conductive joint J2 are coupled to the terminal 110-*a*. Hence, the signal measured via the terminal 110-*a* indicates a capacitance of between a region RB of multi-segment conductive element 110 including conductive joint J1, conductive joint J2, resolving element S1, and resolving element S2 and the additional conductive element 120. The signal represents a deformation of the region RB of the indexable deformation sensor 100. If deformation of the region RA including conductive joint J1 and resolving element S1 is known or has been previously determined, deformation of the portion of the region RB, which includes conductive joint J1, conductive joint J2, resolving element S1, and resolving element S2, that does not overlap region RA can be determined by backing out the deformation of the region RA from the deformation of the region RB.

Figure 3D:
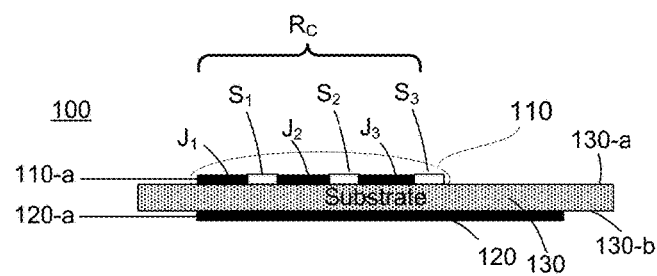

As illustrated in FIG. 3D, turning off resolving element S3, while resolving element S1 and resolving element S2 are turned on, conductive joint J1, conductive joint J2, and conductive joint J3 are coupled to terminal 110-*a*, so the signal indicates a capacitance between a region RC of the multi-segment conductive element 110 including conductive joint J1, conductive joint J2, conductive joint J3, resolving element S1, resolving element S2, and resolving element S3 and the additional conductive element 120. The signal represents a deformation of the region RC of the indexable deformation sensor 100. If deformation of the region RB, described above in conjunction with FIG. 3B, is known or has been previously determined, deformation of the portion of the region RC that does not overlap with the region RB can be determined by backing out the deformation of the region RB from the deformation of the region RC. Thus, using the multi joint conductive element 110, the deformations of different regions (e.g., spatial portions) of the indexable deformation sensor 100 can be determined or resolved by activating and interrogating different conductive joints J1, J2, J3, J4, and J5 of the multi-joint conductive element 110.

FIGS. 4A-4F illustrate each a side view of an indexable deformation sensor comprising different types of resolving elements, in accordance with one or more embodiments. As shown in n FIG. 4A, and further explained above with reference to FIGS. 3A-3D, the indexable deformation sensor 100 comprises multiple conductive joints J1, J2, J3, and J4 along a length of the indexable deformation sensor 100 and separated by resolving elements S1, S2, S3, and S4.

Figure 4A:
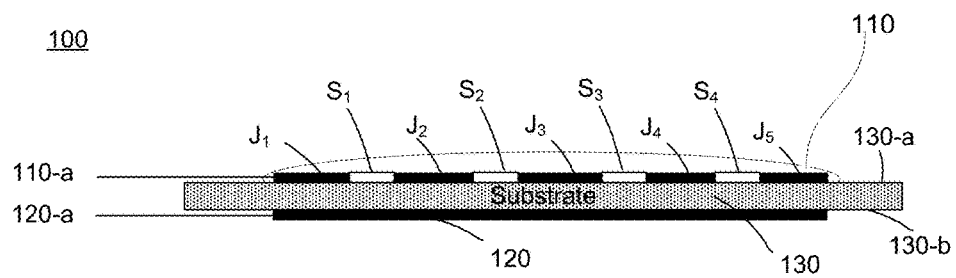
FIG. 4A-4F illustrate each a side view, of an indexable deformation sensor, comprising different types of resolving elements, in accordance with one or more embodiments.
Figure 4B:
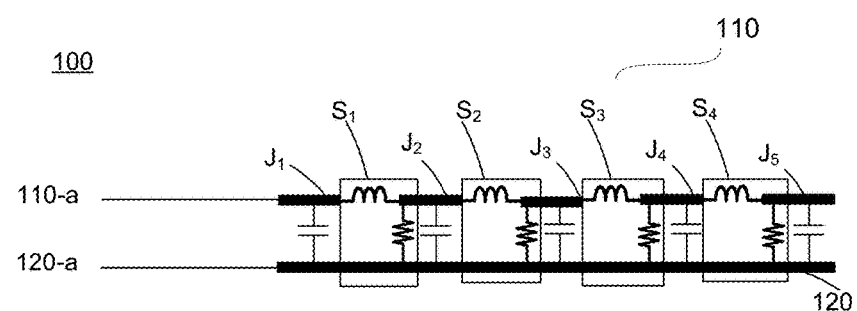
Figure 4C:
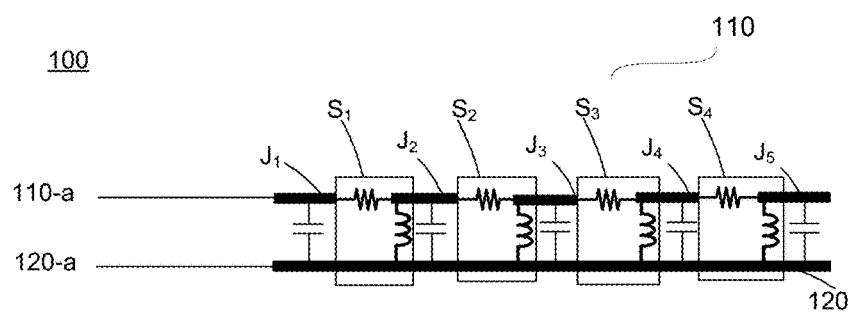

In some embodiments, as illustrated in FIGS. 4B-4C, the resolving elements S1, S2, S4 each comprise an inductor (or materials with impedance properties modeled as series or parallel inductance). In such cases, impedance along the length of the multi joint conductive element 110 in a direction away from the terminal 110-*a* combined with the resolving elements S1, S2, S3, S4 creates a linear filter. Hence, different resolving elements S1, S2, S3, and S4 may be activated or deactivated by different, distinct, frequencies. The frequencies activating different resolving elements S1, S2, S3, and S4 may be configured to be monotonically increasing or decreasing to allow activation or deactivation of individual resolving elements S1, S2, S3, and S4. Modeling the configurations of FIGS. 4B-4C as a series of cascaded RL filters of known topology, a frequency sweep can be used to solve for an unknown resolving element S1, S2, S3, S4 variation from a nominal value, where nominal values are spaced so a dynamic range of each resolving element S1, S2, S3, S4 causes distinct variations across the sweep spectrum. Variation of the electrical parameters of a measured signal correspond to deformation or strain in segments of the indexable deformation sensor 100 including different resolving elements S1, S2, S3, S4. Additionally, non-ideal impedances/inductors/capacitors can be used to implement a non-linear filter, in some embodiments.

Figure 4D:
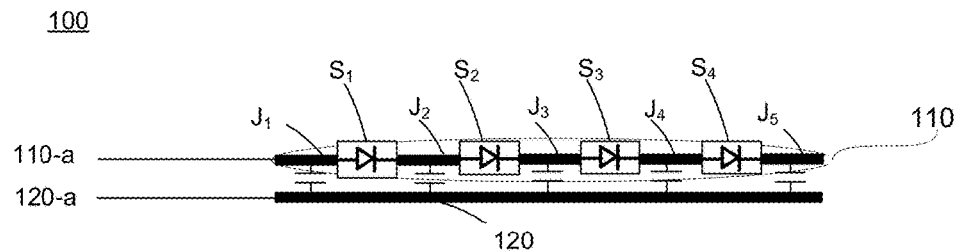

As illustrated in FIG. 4D, the resolving elements S1, S2, S3, S4 are each diode elements that conditionally conduct (e.g., turn on or off) responsive to different magnitudes of forward voltage (e.g., DC and AC voltage or current magnitudes, or variations in time, or frequency components of the stimulus signal), so cascading the diode elements causes a source to provide a higher voltage to overcome the total forward voltage of the resolving elements S1, S2, S3, S4 as a distance from the terminal 110-*a* increases. A deformation (e.g., strain) on each conductive joint J1, J2, J3, J4, J5 of the multi-segment conductive element 110 is obtained by varying a magnitude of a stimulus signal applied to the indexable deformation sensor 100. Driving the configuration of FIG. 4D with a current source can enable parametric variation in the elements (e.g., capacitors, diodes) in each segment of the multi-segment conductive element 110 to vary the number of segments which activate, and the number of segments activated can be used for instrumentation. Alternative to a discrete diode device, each diode in one embodiment may only be logical. For example, the diode could be a bandgap or depletion region caused by dissimilar conductors or semiconductors The resolving elements S1, S2, S3, S4 may alternatively comprise transistor elements (such as bipolar junction or field effect transistors) and may be independently logically addressable. Alternatively, a resolving element S1, S2, S3, S4 implements addressing functions based on a state of the resolving element S1, S2, S3, S4 included in a previous a segment of the multi-segment conductive element 110.

Figure 4E:
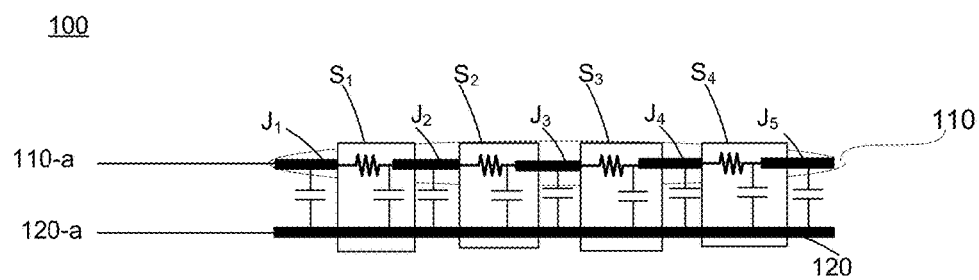
Figure 4F:
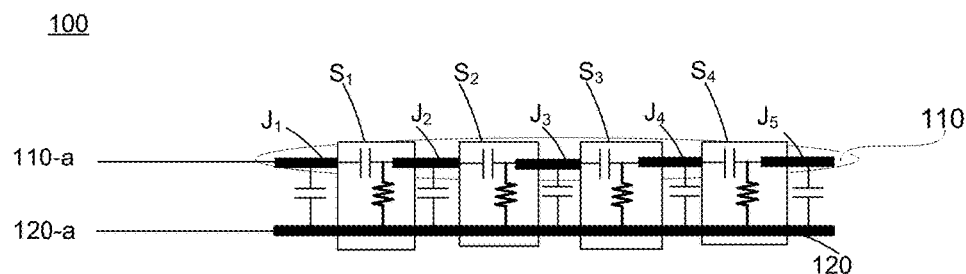

As illustrated in FIG. 4E, the resolving elements S1, S2, S3, S4 correspond to resistive elements (e.g., virtual switches formed by the resistance of the multi-segment conductive element 110). In various embodiments, the resolving elements S1, S2, S3, S4 may not correspond to or include physical or mechanical elements demarcating different conductive joints J1, J2, J3, J4, J5. In such embodiments, the resolving elements S1, S2, S3, S4 form different RC time constants and known transfer functions with the capacitance of the elastic substrate 130 based on the varying resistance from different numbers of resolving elements S1, S2, S3, S4. Hence, different segments of the multi-segment conductive element 110 can be interrogated by different frequencies of a stimulus signal applied to the multi-segment conductive element 110 (without an active switching). Conversely, as illustrated in FIG. 4F, the resolving elements S1, S2, S3, S4 correspond to capacitive elements positioned between the conductive joints J1, J2, J3, J4, J5 with resistive elements formed between the resolving elements S1, S2, S3, S4 and the additional conductive element 120.

Although described above as diodes, resistors, capacitors, and so forth, resolving elements S1, S2, S3, and S4 may be implicit structures only modeled as diodes, resistors, capacitors, and so forth. For example, IE doping variation in the materials used to create the resolving elements can lead to diode bandgaps that could be discrete structures. Effective series or parallel capacitors or resistors may also be implemented by varying the dielectric materials or doping concentrations used.

Figure 5A:
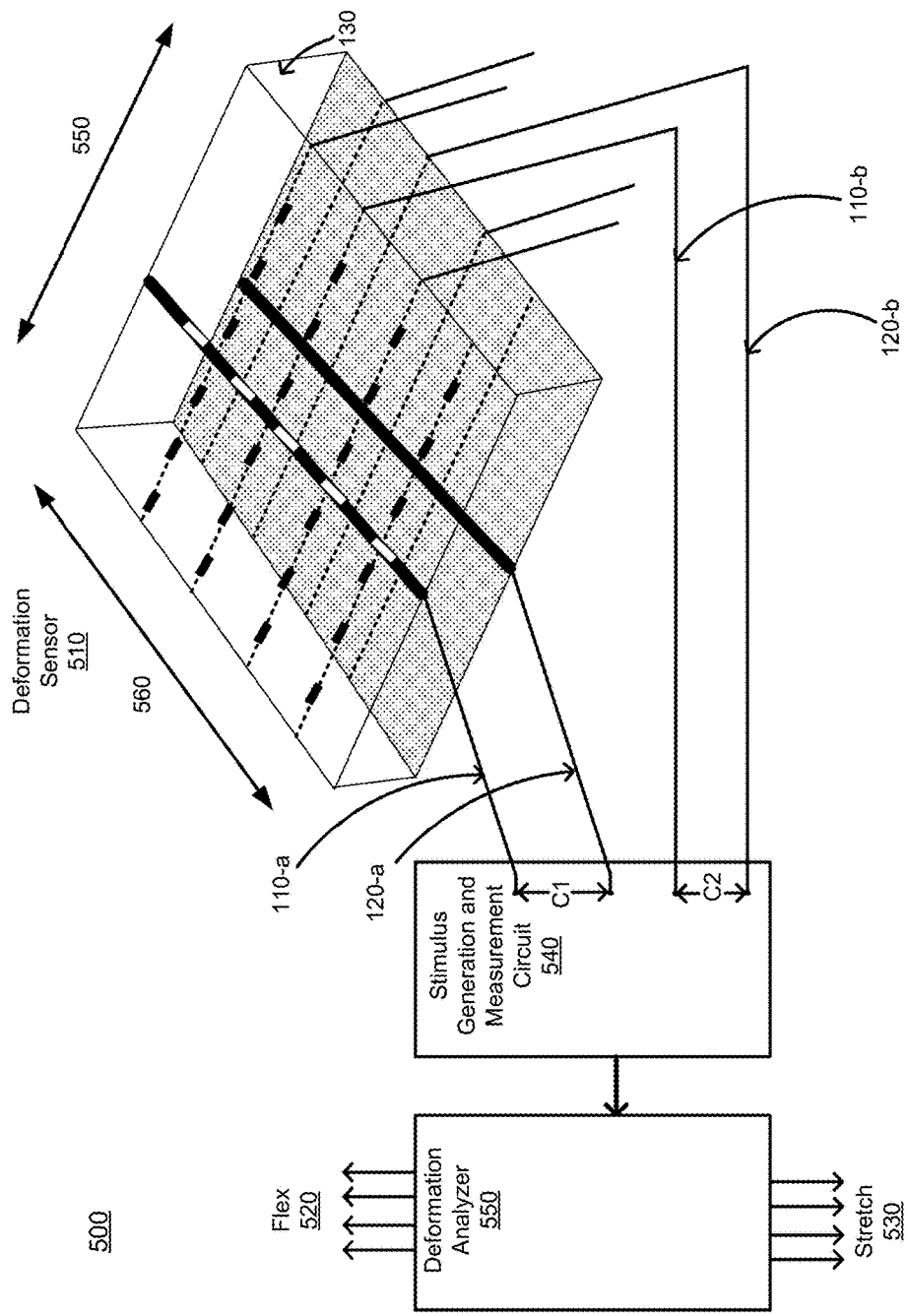
FIG. 5A illustrates a deformation sensing system including a perspective view of a deformation sensing apparatus having a spatial grid of indexable deformation sensors, according to one or more embodiments.

FIG. 5A illustrates a deformation sensing system 500 including a perspective view of a deformation sensing apparatus having a spatial grid of indexable deformation sensors, according to one or more embodiments. As illustrated in FIG. 5A, deformation sensing system 500 includes a deformation sensor 510, a stimulus generation and measurement circuit 540, and a deformation analyzer 550. However, in other embodiments, the deformation sensing system 500 may include different or additional components than those described above in conjunction with FIG. 5A.

In the example shown by FIG. 5A, the deformation sensor 510 includes a multi-dimensional spatial grid of indexable sensors. For example, the deformation sensor 510 of FIG. 5A comprises one or more indexable sensors oriented along a dimension 560 and one or more indexable sensors oriented along an additional dimension 570 orthogonal to the dimension 560. The indexable sensors are further described above in conjunction with FIGS. 1A-4D. For instance, and as explained with reference to FIG. 1A, each of the indexable sensors includes the a multi-segment conductive element 110 and an additional conductive element 120, with an elastic substrate 120 between the multi-segment conductive element 110 and the additional conductive element 110. The elastic substrate 130 is shared between the various indexable sensors of the spatial grid.

In some embodiments, the multi-segment conductive element 110 and the additional conductive element 120 of an individual indexable sensor correspond (e.g., overlap or coincide) to an axis orthogonal to a surface and an additional surface of the elastic substrate 130. In such embodiments, central axes of the multi-segment conductive element 110 and the additional conductive element 120 are parallel to each other and are within a plane that is orthogonal to the surface and the additional surface of elastic substrate 130.

The stimulus generation and measurement circuit 540 is configured to generate stimulus signals that activate (e.g., turn on), deactivate (e.g., turn off), or control attenuation at resolving elements separating different conductive joints of one or more indexable sensors. In some embodiments the resolving elements are resistive elements, such as described above in conjunction with FIG. 4E instead of physical or electromechanical demarcating (e.g., switching) elements between conductive joints, the resolving elements S1, S2, S3, S4 respond to different frequencies of the stimulus signal due because of varying RC time constants along the length of the multi-segment conductive element 110. In such embodiments, different segments including different numbers of conductive joints J1, J2, J3, J4, J5 can be addressed on a frequency basis without requiring "active switching." Hence, passive elements (such as capacitive and resistive switching elements as shown in FIG. 4E) corresponding to different segments are selected by different stimulus frequencies. The stimulus generation and measurement circuit 540 measures a capacitance between the multi-segment conductive element 110 and the additional conductive element 120. In various embodiments, the additional conductive element 120 also obtains an additional signal from the additional conductive element 120 in response to a deformation of the deformation sensor 510. As further explained with reference to FIGS. 3A-3D, different segments of the multi-segment conductive element 110 can be probed or interrogated by activating or deactivating different resolving elements S1, S2, S3, S4 along a length of the deformation sensor 510. Corresponding measures of stretch or flex deformations at different segments along the length of the multi-segment conductive element 110 can be resolved.

In some embodiments, the signal indicates a capacitance (C) or capacitance change (ΔC) between the multi-segment conductive element 110 and the additional conductive element 120 across the elastic substrate 130, within a spatial region corresponding to a length of the multi-segment conductive element 110 to a deactivated resolving element S1, S2, S3, S4, measured responsive to the applied deformation. In some embodiments, the signal is measured responsive to application of a known electrical signal (e.g., an alternating current electrical signal) applied between a terminal (e.g., terminal 110-a) of the multi-segment conductive element 110 and a terminal (e.g., terminals 120-a) of the additional conductive element 120.

The measurement circuit 540 may have two measurement phases in various embodiments. During a first phase, resistance of the additional conductive element 120 is measured by application of a known voltage or current to the additional conductive element 120. During a second, phase, the measurement circuit 540 measures a capacitance C across the multi-segment conductive element 110 and the additional conductive element 120 across the elastic substrate 130, within a spatial region corresponding to a length of the multi-segment conductive element 110 to a deactivated resolving element S1, S2, S3, S4.

The deformation analyzer 550 computes measures (e.g., an absolute metric or a fractional proportion) of stretch deformation 530 of different segments of the deformation sensor 510 and measures (e.g., an absolute metric or a fractional proportion) of flex deformation 520 of different segments of the deformation sensor 510, based on the measured capacitance of various segments of the deformation sensor 510, as explained with reference to FIGS. 3A-3D, when the deformation sensor 510 is deformed. In some embodiments, stretch deformation 530 is determined as a strain on the additional conductive element 120, computed as a ratio of a change in length of the additional conductive element 120 to an undeformed length of the additional conductive element 120 [i.e., (ΔL1+ΔL2)/2L0; where ΔL1 and ΔL2 are changes in the lengths of different segments of the additional conductive element 120 and L0 the undeformed length of the additional conductive element 120, or (ΔL)/L0 if ΔL1=ΔL2=ΔL]. For example, an additional conductive element 120 having an undeformed length of 10 cm stretched to 15 cm has undergone a strain of 50%. In some embodiments, the measure of stretch deformation 530 indicates an average change in lengths of the multi-segment conductive element 110 and the additional conductive element 120. In such embodiments, the deformation analyzer 550 computes the measure of stretch deformation as:

$$R_1 = R_0 + \Delta R_1 = R_0 + (GF \cdot \Delta L_1) \qquad (1)$$

$$C = \varepsilon \frac{\text{Area}}{\text{gap}} = \varepsilon \frac{L_0 \cdot W_0}{g} = \varepsilon \frac{L_0 \cdot W_0}{(g_0 - \Delta L \cdot \gamma)} = \varepsilon \frac{L_0 \cdot W_0}{\left(g_0 - \left(\frac{\Delta L_1 + \Delta L_2}{2}\right)\right)} \qquad (2)$$

where R1 is the resistance of the additional conductive element 120, and C is the capacitance across the multi-segment conductive element 110 and the additional conductive element 120 across the elastic substrate 130;

Area is an overlap between the multi-segment conductive element 110 and the additional conductive element 120, GF is a Gauge Factor relating strain and resistance, Y is a Poisson's Ratio of the elastic substrate relating 130 deformations between axes, $L_0$ is an undeformed length of the multi-segment conductive element 110 and the additional conductive element 120, ΔL, $\Delta L_1$, $\Delta L_2$ are length changes of different segments of the additional conductive element 120, $W_0$ is an undeformed length of the multi-segment conductive element 110 and the additional conductive element 120, ε is a dielectric constant of the elastic substrate 130, $R_0$ is a baseline resistance of the additional conductive element 120, and $g$, $g_0$ are, respectively, deformed and baseline widths of the elastic substrate 130.

Alternatively, if $\Delta L_1 = \Delta L_2 = \Delta L$, then:

$$R_1 = R_0 + (GF \cdot \Delta L) \quad (3)$$

$$C_{stretch} = \varepsilon \frac{L_0 \cdot W_0}{g} = \varepsilon \frac{L_0 W_0}{g_0 - \left(\frac{\Delta L_1 - \Delta L_2}{2}\right)\gamma} = \varepsilon \frac{L_0 \cdot W_0}{g_0 - \Delta L \cdot \gamma} \quad (4)$$

In some embodiments, the measure of flex deformation 520 indicates an angular bend of the surfaces of the elastic substrate 130 on which the multi-segment conductive element 110 and the additional conductive element 120 are formed. For example, the measure of flex deformation 520 corresponds to a radius subtended by (e.g., average radius of curvature or bend radius for) arcs formed from bending of the surfaces of the elastic substrate 130 on which the multi-segment conductive element 110 and the additional conductive element 120 are formed. The deformation analyzer 550 computes the measure of flex deformation as $$C_{bend} = C_0 \text{ because } g = g_0 \quad (5)$$

$$R_1 = R_0 + (GF \cdot \Delta L_1) \approx R_0 + \left(\frac{g}{2\rho_1} \cdot GF\right) \quad (6)$$

where R1 is the resistance of the additional conductive element 120, and $C_{bend}$ is the capacitance across the multi-segment conductive element 110 and the additional conductive element 120 across the elastic substrate 130;

GF is a Gauge Factor relating strain and resistance of the additional conductive element 120, Y is a Poisson's Ratio of the elastic substrate 130 relating deformations between axes, $L_0$ is an undeformed length of the additional conductive element 120, $\Delta L_1$, $\Delta L_2$ are length changes of the additional conductive element 120, $R_0$ is a baseline resistance of the additional conductive element 120, g, is a deformed width of the elastic substrate 130, and $\rho_1$ and $\rho_2$ are bend radii of the surface and the additional surface of the elastic substrate 130.

If stretch and flex deformations are combined (both present), and for a configuration where $C_{bent} \neq C_0$ (i.e., the measured capacitance of the bent deformation sensor 510 differs from the capacitance of the unbent deformation sensor 510), the measures of stretch deformation 530 and flex deformation 520 are computed by calculating a common $\Delta L_{stretch}$ for the additional conductive element 120 (using equation 3), subtracting from the resistance of the additional conductive element 120 (R1), and calculating a bend radius $\rho_1$ (equation 6). When stretch and flex deformations are both present, a superposition of the stretch deformation 530 and the flex deformation 520 is considered. A total stretch is estimated based on the capacitance (or by proxy, the gap corresponding to the deformed width of the elastic substrate 130) of the elastic substrate 130. A new baseline length (Lo') of the additional conductive element 120 is computed (e.g., using equation 3), and a new baseline resistance (R1') of the additional conductive element 120 is determined. A curvature (measure of flex) is computed based on a difference between the length (L1) of the additional conductive element 120 and the new baseline length of the additional conductive element 120 (Lo') (alternately represented as a difference between the resistance of the additional conductive element 120 and the new baseline resistance of the additional conductive element 120), for example, using the same method (e.g., equation 6) as described for curvature (flex).

Figure 5B:
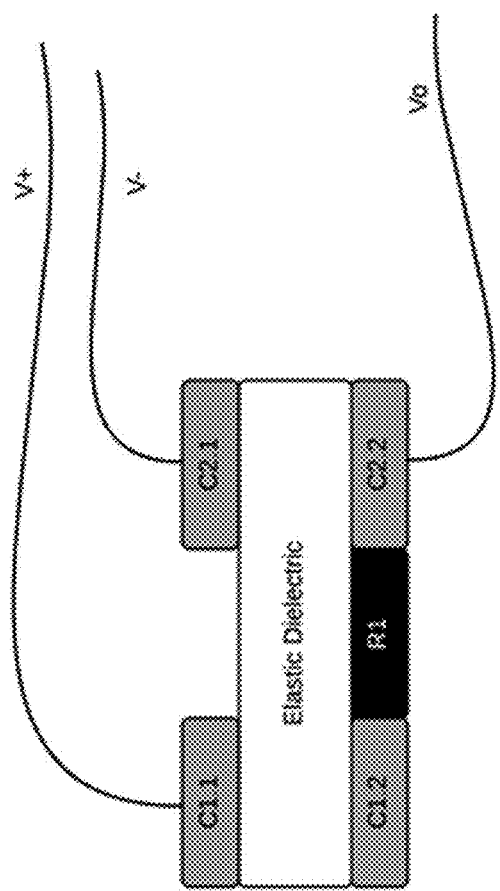
FIGS. 5B-5C illustrate a bandpass filter formed by the switching elements of the indexable deformation sensor, according to some embodiments.
Figure 5C:
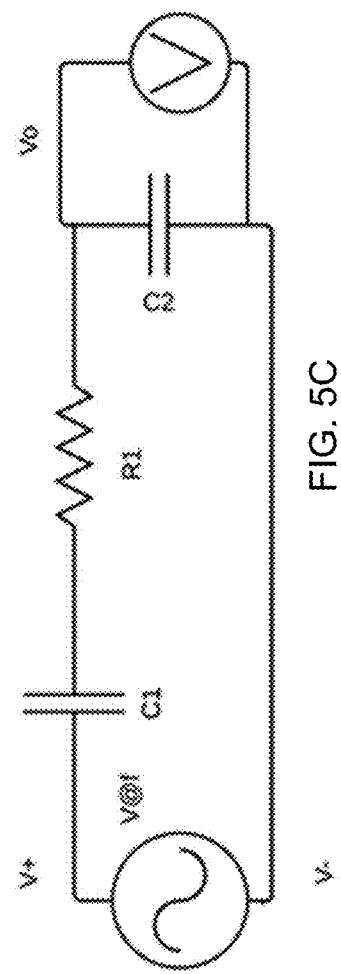

FIGS. 5B and 5C illustrate a bandpass filter formed by the resolving elements of the indexable deformation sensor, according to some embodiments. Referring to FIGS. 5B-5C, the frequency of each of the two knees of the magnitude response of the bandpass filter varies with one of the capacitors, which are isolated to respond to local stress. Hence, sweeping a frequency of the source signal identifies the −3 dB frequencies of the two knees, allowing each capacitor to be determined from a single sense line. Using parallel circuits having substantially differing center frequencies allows this configuration to be scaled.

FIGS. 6A-6D illustrate an embodiment of a bend angle sensor worn on a finger of a user that comprises one or more indexable deformation sensors 630. FIGS. 6E-6G illustrate activation of different switching elements of the bend angle sensor worn on the user's finger, resulting in connections of different combinations conductive joints of the indexable deformation sensor 630 for measuring bend angles of different joints of the finger. In some embodiments, using an indexable deformation sensor 630 within a region of a wearable device that internally undergoes different measures of stretches or bends along different indexable segments of the indexable deformation sensor 630 is beneficial. For instance, different amounts of stretching occur in different parts of a moving object or moving wearable device, so a sensor fixed merely at the ends of the sensor has the same tension throughout the length of the sensor, which prevents the sensor from resolving different amounts of stretching in different parts of the moving object. However, using an indexable deformation sensor 630 that is fixed in multiple locations to the moving object or to the moving wearable device, different amounts of stretching of the different regions of the moving object can be independently resolved and measured. Similarly, for bending deformations, an object (e.g., a body part) may bend at a location of one of the conductive joints of the sensor indexable deformation sensor 630, but not at other conductive joints, so allowing spatial indexing of the conductive joints allows the bend to be more precisely resolved.

As illustrated in FIGS. 6A-6D, a contour of the indexable deformation sensor 630 is modified as a function of a bend angle of the finger. In some embodiments, the multi-segment conductive element 110 of the indexable deformation sensor 630 has electrically conductive joints formed over regions of the finger (or other body part) that are most likely to be bent or stretched (e.g., over articulating joints like finger knuckles). Resolving elements separating electrically conductive joints from each other are formed in portions of the multi-segment conductive element 110 that are over portions of the finger (or other body part) least likely to undergo bend or stretch (e.g., over finger segments formed between the knuckles).

Figures 6A, 6B, 6C, 6D:
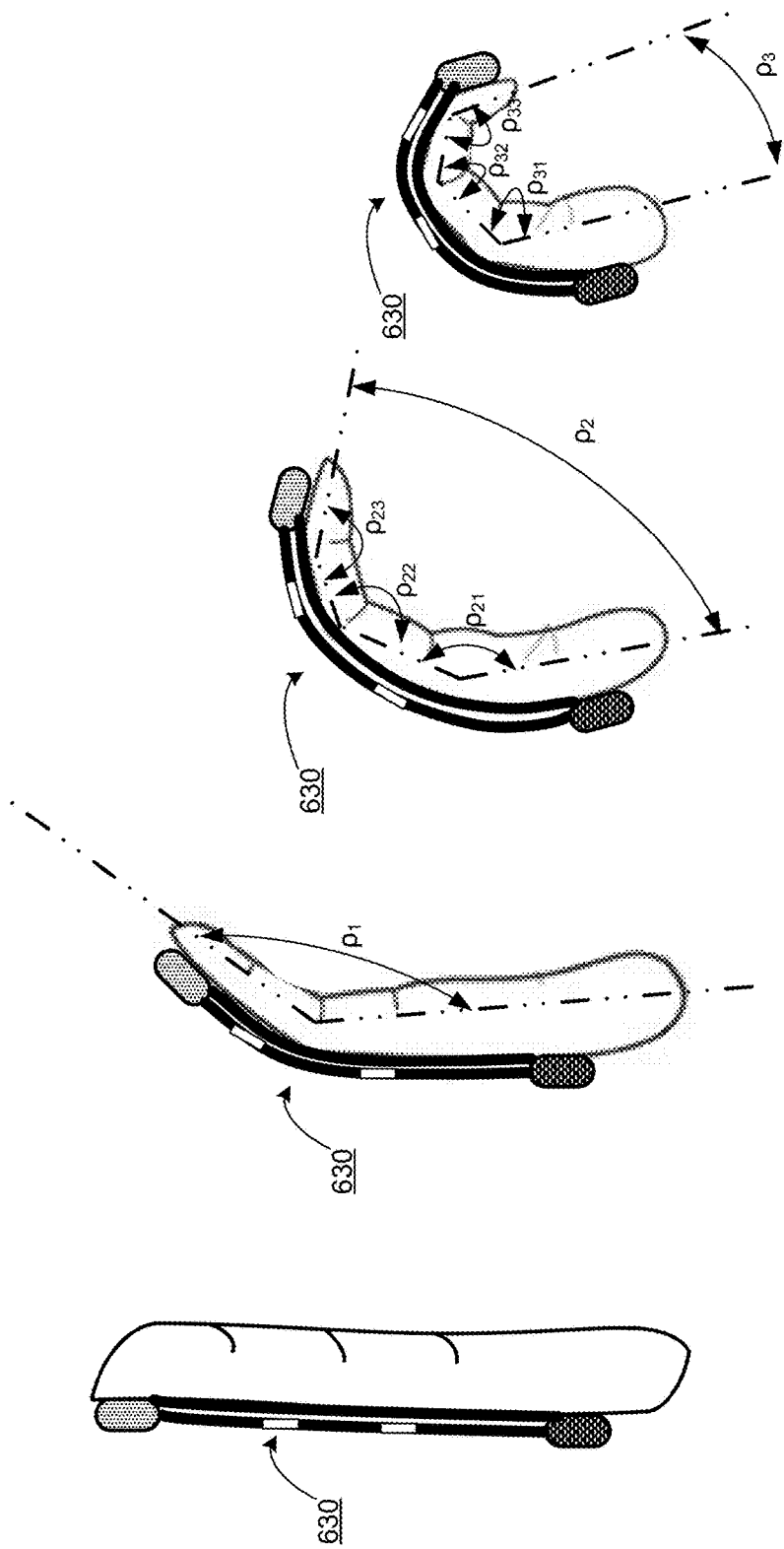
FIGS. 6A-6D include illustrations of a bend angle sensor worn on a finger and comprising one or more indexable deformation sensors, according to one or more embodiments.
Figure 6G:
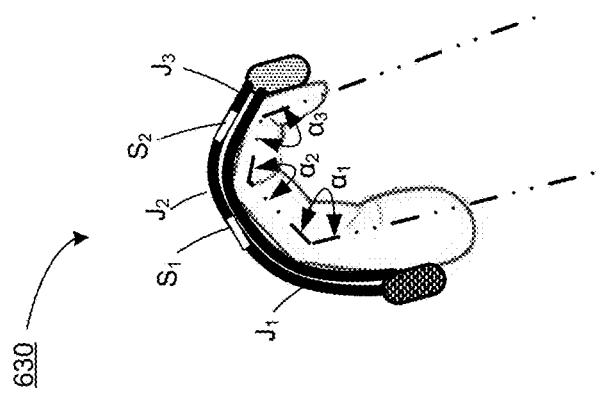
FIGS. 6E-6G illustrate activation of different resolving elements of the bend angle sensor worn on a finger, resulting in connections of different combinations conductive joints of the indexable deformation sensor, for measuring bend angles of different joints of the finger, according to one or more embodiments.
Figure 6F:
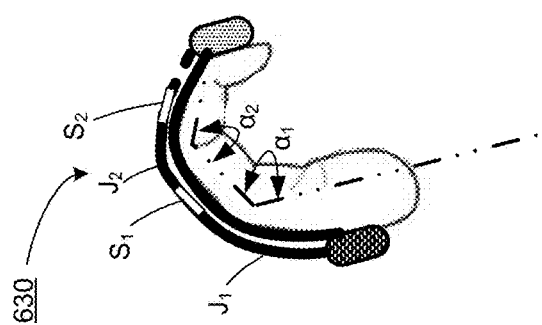
Figure 6E:
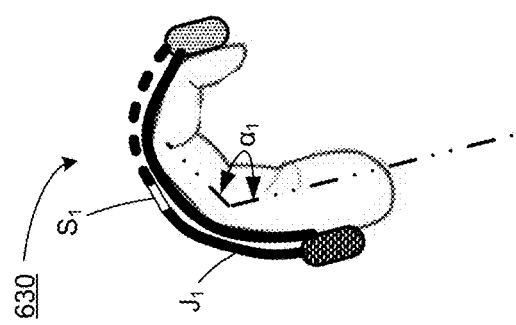

In some embodiments, the bend angle of individual conductive joints (e.g., individual angles ρ21, ρ22, ρ23, ρ31, ρ32, ρ33 illustrated in FIGS. 6C-6D) may be individually resolved by indexing and interrogating different conductive joints of the multi-segment conductive element 110 of the indexable deformation sensor 630. When resolving bend angle, the calculations and measurements described with reference to FIG. 5 and equations 1-6 may be solved in parallel for different segments of the multi-segment conductive element 110. In embodiments where the additional conductive element 120 is a single non-indexed electrode or strain gauge, a change in length of the additional conductive element 120 rather than changes in length of different segments of the additional conductive element 120 is used in the calculations described above in conjunction with FIG. 5. Alternatively or additionally, in some embodiments, a bend angle (e.g., ρ1 shown in FIG. 6B) of the entire finger is computed based on the deformations of different segments of the indexable deformation sensor 630. In some embodiments, the additional conductive element 120 is a strain gauge element, so a measure of flex and/or bend deformation of the additional conductive element 120 is used in addition to the deformation of various portions of the multi-segment conductive element 110 to determine the bend angle of different conductive joints of the multi-segment conductive element 110.

FIGS. 6E-6G illustrate activation of different resolving elements S1, S2 of the indexable deformation sensor 630 worn on a finger. As different resolving elements S1, S2 are activated, different combinations of conductive joints J1, J2, J3 are coupled together, allowing measurement of bend angles for different joints of the finger.

As illustrated in FIG. 6E, by deactivating resolving element S1 causes interrogation of conductive joint J1, while conductive joints J2 and J3 are not interrogated. Hence, the signal measured by a measurement circuit (as further described above in conjunction with FIG. 5) indicates a capacitance measured between conductive joint J1 and the additional conductive element 120. The capacitance between J1 and the additional conductive element 120 represents a bend angle ($\alpha 1$) and/or stretch of a joint of the finger proximate to conductive joint J1.

In FIG. 6F, resolving element S1 is activated and resolving element S2 is deactivated, so conductive joint J1 and conductive joint J2 are both interrogated. Here, the signal measured by the measurement circuit indicates a capacitance measured between the combined lengths of conductive joint J1 and conductive joint J2 and the additional conductive element 120. The capacitance accounting for the combined lengths of conductive joint J1 and conductive joint J2 represents bend angles ($\alpha 1$ and $\alpha 2$) and/or stretch of joints of the finger proximate to conductive joint and conductive joint J2. If a bend angle $\alpha 1$ of the joint of the finger proximate to conductive joint J1 is known or previously determined, the bend angle $\alpha 2$ of a joint of the finger proximate to conductive joint J2 may be determined by backing out the measure of $\alpha 1$ from the combined measurement representing the bend angles of joints of the finger proximate to conductive joint J1 and conductive joint J2.

FIG. 6G shows an example where resolving element S1 and resolving element S2 are both activated, causing conductive joint J1, conductive joint J2, and conductive joint J3 to be interrogated. Here, the signal measured by the measurement circuit indicates a capacitance measured between the combined lengths or areas of conductive joint J1, conductive joint J2, and conductive joint J3 as well as additional conductive element 120, and represents bend angles ($\alpha 1$, $\alpha 2$, and $\alpha 3$) and/or stretch of joints of the finger proximate to conductive joint J1, conductive joint J2, and conductive joint J3. If bend angles $\alpha 1$ and $\alpha 2$ of joints of the finger proximate to conductive joint J1 and conductive joint J2, respectively, are known or previously determined, the bid angle $\alpha 3$ of the joint of the finger proximate to conductive joint J3 can be determined by backing out the measures of the bend angles $\alpha 1$ and $\alpha 2$ of joints of the finger proximate to conductive joint J1 and conductive joint J2 from the combined measurement representing the bend angles of joints of the finger proximate to conductive joint J1, conductive joint J2, and conductive joint J3.

Figure 7:
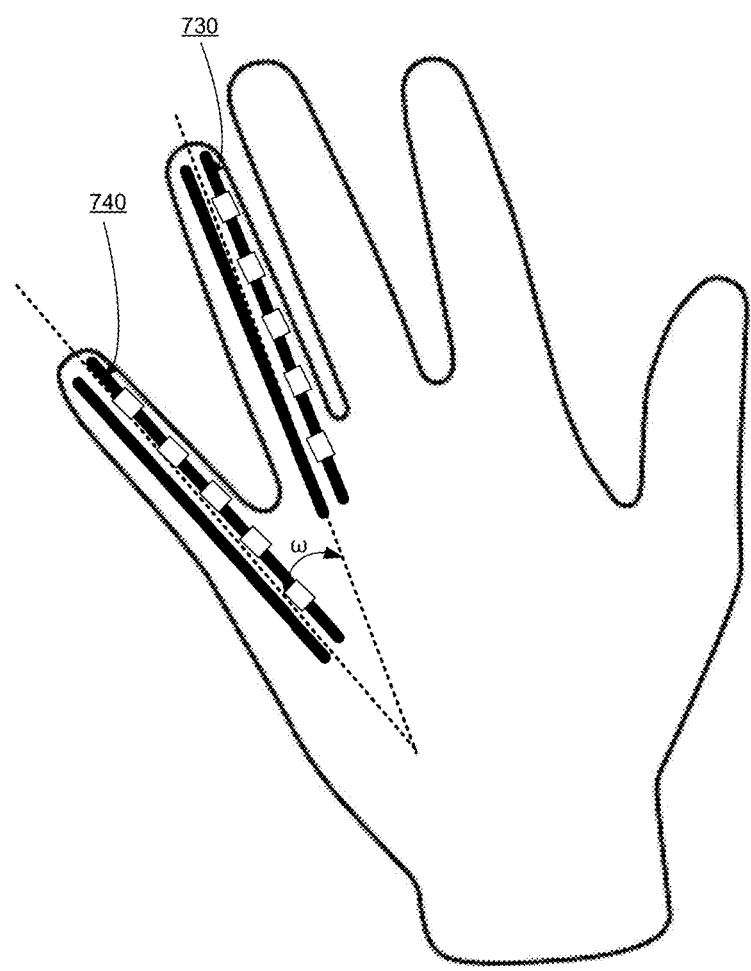
FIG. 7 illustrates an application of indexable deformation sensors for measuring lateral (e.g., planar) angles between fingers, according to one or more embodiments.

FIG. 7 illustrates an application of indexable deformation sensors for measuring lateral (e.g., planar) angles between fingers, according to one or more embodiments. As illustrated in FIG. 7, indexable deformation sensor 730 positioned along a length of a finger and indexable deformation sensor 740 is positioned along a length of an additional finger. Signals from indexable deformation sensor 730 and indexable deformation sensor 740 may be used together to determine a lateral angular separation (e.g., planar angle ω) between the finger and the additional finger. The indexable deformation sensor 730 and indexable deformation sensor 740 may be included within a wearable glove to be worn around a hand.

FIGS. 8-11 illustrate examples of wearable systems that include one or more indexable deformation sensors. In one or more embodiments, a wearable device or system comprises one or more indexable deformation sensors (such as those explained with reference to FIGS. 1A-7). The wearable device or system may also include the stimulus generation and measurement circuit and deformation analyzer, as further described above in conjunction with FIG. 5. Alternatively, the wearable device may include one or more indexable deformation sensors, and optionally the stimulus generation and measurement circuit, and signals captured by the measurement circuit are provided to a remote device including the deformation analyzer.

In some embodiments, the multi-segment conductive element 110 and the additional conductive element 120 are configured to circumscribe or surround one or more articulating joints. Thus, when the wearable device is positioned or worn around the joints, a movement of the joints results in a corresponding deformation of different portions of the indexable deformation sensor. Based on signals measured from the indexable deformation sensor, measures of stretch deformation and flex deformation of the different joints can be resolved and independently determined, as further described above in conjunction with FIGS. 5-6G.

Figure 8:
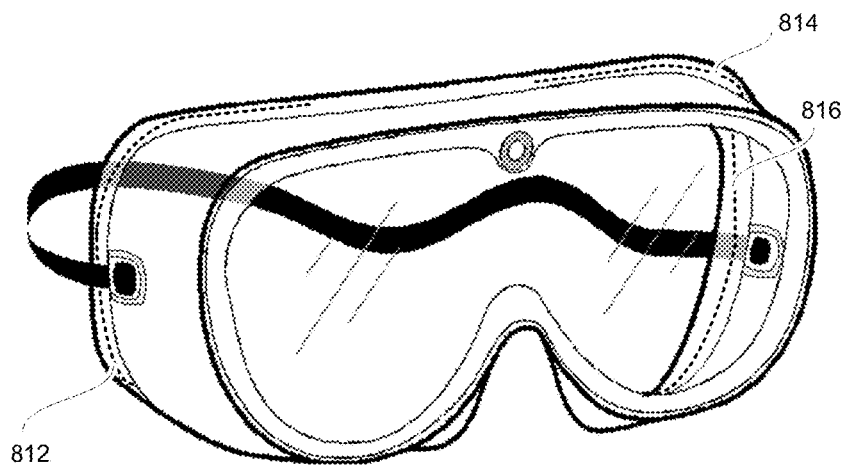
FIGS. 8-11 illustrate examples of wearable systems that include one or more indexable deformation sensors, according to one or more embodiments.
Figure 9:
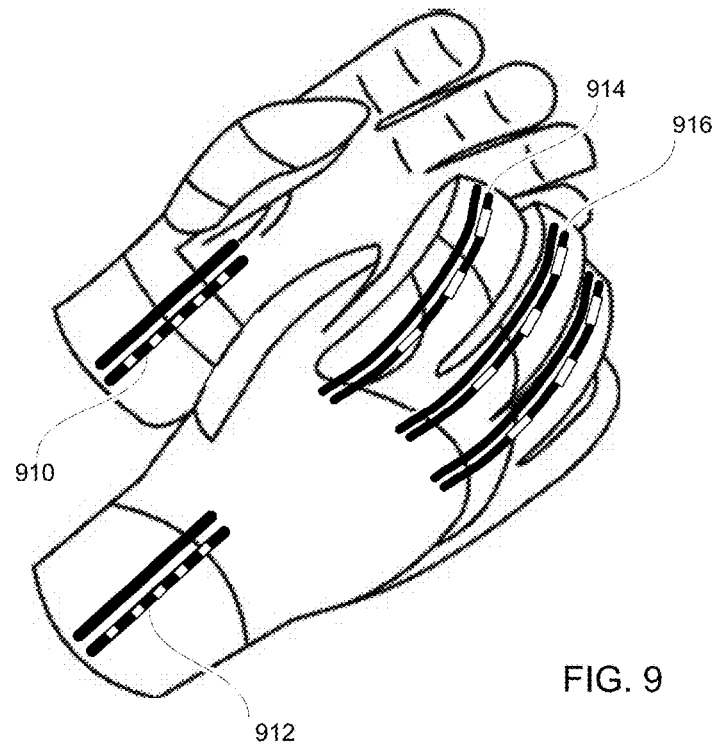

FIG. 8 shows a wearable headset configured to be worn around a portion of the face. Correspondingly, the indexable deformation sensors 812, 814, 816 are arranged to be substantially concentric with (circumscribing) sockets of a user's eyes or aligned with portions of the user's forehead and cheek bone to sense movement of those body parts. FIG. 9 shows a glove configured to be worn around the hand or a cover (e.g., thimble or guard band) to be worn over a finger or wrist. In the example of FIG. 9, indexable deformation sensors 910 and 912 are aligned with a user's wrists when the gloves are worn, while indexable deformation sensors 914 and 916 align with joints of the user's fingers when the gloves are worn. Alternatively or additionally, a wearable device includes indexable deformation sensors configured to be above, below, or on a side of one or more joints of a user wearing the wearable device.

Figure 10:
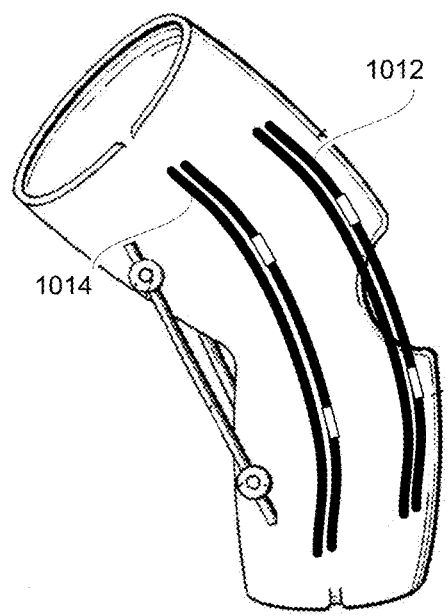
Figure 11:
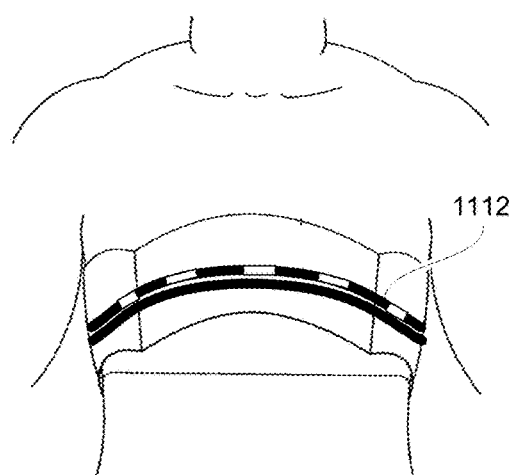

FIG. 10 shows a brace configured to be worn over a knee, elbow, ankle, or shoulder joint. The brace includes the indexable deformation sensors 1012 positioned along a length of a joint of a user's, elbow, ankle, or shoulder joint. Alternatively or additionally, the brace includes an indexable deformation sensor 1014 positioned be above, below, or to a side of a user's joint. FIG. 11 shows a support brace configured to be worn over a portion of a user's torso ((e.g., chest, back, or waist). The support brace shown in FIG. 11 includes an indexable deformation sensor 1112 configured to a contour of a user's neck or portion of a user's torso when the user wears the support brace.

In one or more embodiments, the indexable deformation sensors further described above in conjunction with FIGS. 1A-11 used in conjunction with a virtual reality (VR) system. For example, information describing stretching, bending, or angular separation of a user's body parts (e.g., fingers) is provided from an indexable deformation sensor is provided to a component of a VR system, allowing the VR system to render a representation of the user's body parts in a VR environment based on the information. For example, states of a user's hand (e.g., open, closed, pointing, gesturing, etc.) can be determined from one or more indexable deformation sensors, allowing generation of a representation of the user's hand in a VR environment based on the detected state of fingers of the user's hand.

The foregoing description of the embodiments has been presented for the purpose of illustration; it is not intended to be exhaustive or to limit the embodiments to the precise forms disclosed. Persons skilled in the relevant art can appreciate that many modifications and variations are possible in light of the above disclosure. The language used in the specification has been principally selected for readability and instructional purposes, and it may not have been selected to delineate or circumscribe the inventive subject matter. It is therefore intended that the scope of the embodiments be limited not by this detailed description, but rather by any claims that issue on an application based hereon. Accordingly, the disclosure of the embodiments are intended to be illustrative, but not limiting, of the scope of the embodiments.

What is claimed is:

1. A wearable deformation sensing device comprising:
    a substrate; and
    a circuit comprising:
        a first conductive element on a first side of the substrate comprising a plurality of conductive joints and a plurality of resolving elements, each conductive joint corresponds to a segment of the first conductive element that is separated from another conductive joint by a resolving element; and
        a second conductive element on a second side of the substrate, wherein a stimulus signal applied to the circuit results in a capacitance between a conductive joint of the first conductive element and the second conductive element for each segment, and wherein each segment is configured to output a unique response signal to the stimulus signal based on a location of the segment on the first conductive element.

2. The wearable deformation sensing device of claim 1, wherein the substrate of the wearable deformation sensing device is configured to be worn by a user, conform to a body part of the user, and detect deformation of one or more portions of the body part of the user.

3. The wearable deformation sensing device of claim 2, wherein the wearable deformation sensing apparatus is a glove and the body part is a hand, and wherein detecting deformation of one or more portions of the body part of the user includes:
    detecting changes in at least one of orientations or positions of points on the glove to determine a state of the hand of the user.

4. The wearable deformation sensing device of claim 3, wherein the state of the hand is determined based on a bend angle of one or more fingers of the user corresponding to the positions or orientations of points on the glove.

5. The wearable deformation sensing device of claim 2, wherein the wearable deformation sensing apparatus is configured to be worn by the user on at least one of an elbow or wrist of the user.

6. The wearable deformation sensing device of claim 1, wherein the circuit is configured to:
    apply the stimulus signal to the first conductive element resulting in the capacitance between the conductive joint of the first conductive element and the second conductive element for each segment, and
    measure the unique response signal corresponding to a change in the capacitance between the conductive joint of the first conductive element and the second conductive element in response to a strain being applied to one or more segments of the first conductive element.

7. The wearable deformation sensing device of claim 1, wherein each resolving element is a resistive element including at least one resistor, so the response signal is based a location along a length of the first conductive element from which the response signal is measured and a change in thickness of the substrate between the first conductive element and the second conductive element at the location along the length of the first conductive element in response to a strain, and wherein the second conductive element is a strain gauge configured to output a signal in response to the strain being applied to a segment of the wearable deformation sensing device.

8. The wearable deformation sensing device of claim 7, further comprising:
    a deformation analyzer coupled to the circuit and configured to compute a measure of stretch deformation and flex deformation of the wearable deformation sensing device based on the signal and the signal output by the strain gauge.

9. The wearable deformation sensing device of claim 1, wherein a strain in a segment of the conductive element causes a variation of an electrical parameter of the segment relative to a nominal value of the electrical parameter for the segment that is measured by the circuit from the unique response signal, each variation of the electrical parameter relative to the nominal value of the electrical parameter corresponding to a different magnitude of the strain in the segment.

10. The wearable deformation sensing device of claim 9, wherein each resolving element comprises a diode configured to conduct and resist responsive to a different magnitude of the stimulus signal, and wherein the circuit is configured to apply different magnitudes of the stimulus signal to the first conductive element and to measure a response signal from different segments of the wearable deformation sensing device in response to application of the different magnitudes of the stimulus signal.

11. The wearable deformation sensing device of claim 9, wherein the plurality of conductive joints and the plurality of resolving elements form a continuous strip, each segment of the continuous strip having an effective RC time constant based on a combination of a resistance of the continuous strip and the capacitance between each conductive joint and the additional conductive element along the length of the conductive element.

12. The wearable deformation sensing device of claim 9, wherein each resolving element comprises an inductor, and a combination of an impedance of conductive joints along a length of the first conducting element and the inductor of each resolving element creating linear filters along the length of the first conductive element, each linear filter having a distinct frequency of operation that is used to determine a location of the inductor along the length of the first conductive element corresponding to the strain.

13. A strain sensor comprising:
an elastic dielectric substrate;
a circuit comprising:
   a first conductive element on a first side of the elastic dielectric substrate comprising a plurality of conductive joints and a plurality of resolving elements, each conductive joint corresponds to a segment of the first conductive element that is separated from another conductive joint by a resolving element; and
   a second conductive element on a second side of the elastic dielectric substrate, wherein a stimulus signal applied to the circuit results in a capacitance between a conductive joint of the first conductive element and the second conductive element for each segment, and wherein each segment is configured to output a unique response signal to the stimulus signal based on a location of the segment on the first conductive element;
   wherein the circuit is configured to:
      apply the stimulus signal to the first conductive element resulting in the capacitance between the conductive joint of the first conductive element and the second conductive element for each segment, and
      measure the unique response signal corresponding to a change in the capacitance between the conductive joint of the first conductive element and the second conductive element in response to a strain being applied to one or more segments of the first conductive element.

14. The strain sensor of claim 13, wherein the elastic dielectric substrate of the strain sensor is configured to be worn by a user, conform to a body part of the user, and detect deformation of one or more portions of the body part of the user.

15. The strain sensor of claim 14, wherein the strain sensor is a glove and the body part is a hand, and wherein detecting deformation of one or more portions of the body part of the user includes:
   detecting changes in at least one of orientations or positions of points on the glove to determine a state of the hand of the user.

16. The strain sensor of claim 15, wherein the state of the hand is determined based on a bend angle of one or more fingers of the user corresponding to the positions or orientations of points on the glove.

17. The strain sensor of claim 14, wherein the strain sensor is configured to be worn by the user on at least one of an elbow or wrist of the user.

18. The strain sensor of claim 13, wherein each resolving element is a resistive element including at least one resistor, so the response signal is based a location along a length of the first conductive element from which the response signal is measured and a change in thickness of the substrate between the first conductive element and the second conductive element at the location along the length of the first conductive element in response to a strain, and wherein the second conductive element is a strain gauge configured to output a signal in response to the strain being applied to a segment of the strain sensor.

19. The strain sensor of claim 18, further comprising:
   a deformation analyzer coupled to the circuit and configured to compute a measure of stretch deformation and flex deformation of the strain sensor based on the signal and the signal output by the strain gauge.

20. The strain sensor of claim 19, wherein the strain in a segment of the conductive element causes a variation of an electrical parameter of the segment relative to a nominal value of the electrical parameter for the segment that is measured by the circuit from the unique response signal, each variation of the electrical parameter relative to the nominal value of the electrical parameter corresponding to a different magnitude of the strain in the segment.

* * * * *